US009786431B2

(12) United States Patent
Hudson (10) Patent No.: US 9,786,431 B2
(45) Date of Patent: Oct. 10, 2017

(54) ELECTRICAL POWER AND/OR ELECTRICAL SIGNAL TRANSMISSION

(75) Inventor: Steven Martin Hudson, Sturminster Newton (GB)

(73) Assignee: Expro North Sea Limited, Reading (GB)

( * ) Notice: Subject to any disclaimer, the term of this patent is extended or adjusted under 35 U.S.C. 154(b) by 1112 days.

(21) Appl. No.: 13/996,251

(22) PCT Filed: Dec. 13, 2011

(86) PCT No.: PCT/GB2011/001713
§ 371 (c)(1),
(2), (4) Date: Jun. 20, 2013

(87) PCT Pub. No.: WO2012/085495
PCT Pub. Date: Jun. 28, 2012

(65) Prior Publication Data
US 2013/0293029 A1    Nov. 7, 2013

(30) Foreign Application Priority Data
Dec. 20, 2010  (GB) .................................. 1021750.3

(51) Int. Cl.
  *H02J 17/00*  (2006.01)
  *H01F 38/14*  (2006.01)
  (Continued)

(52) U.S. Cl.
  CPC ........... *H01F 38/14* (2013.01); *E21B 17/028* (2013.01); *E21B 47/122* (2013.01); *H04B 3/546* (2013.01);
  (Continued)

(58) Field of Classification Search
  CPC .................................................... H02J 17/00
  (Continued)

(56) References Cited

U.S. PATENT DOCUMENTS 2,364,957 A    12/1944  Douglas
3,129,394 A     4/1964  Long
(Continued)

FOREIGN PATENT DOCUMENTS

EP    0964134 A2    12/1999
GB    2083321 A     3/1982
(Continued)

OTHER PUBLICATIONS

International Search Report for International Application No. PCT/GB00/02538, dated Oct. 5, 2000.
(Continued)

*Primary Examiner* — Rexford Barnie
*Assistant Examiner* — Joseph Inge (57) ABSTRACT

An electrical power and/or electrical signal transmission system for transmitting electrical power and/or electrical signals from a location on a first side of a metallic wall to a location on a second side of the metallic wall includes a transmitting apparatus having an electrical source and a first transformer. A receiving apparatus has a receiving module for receiving electrical power and/or electrical signals and a second transformer. First and second ends of a primary winding of the second transformer are electrically connected to respective spaced locations on the second, opposite, side of the metallic wall for picking up electrical power and/or electrical signals from the metallic wall. The receiving module is electrically connected to a secondary winding of the second transformer to enable electrical power and/or electrical signals to be transmitted from the electrical source to the receiving module.

19 Claims, 2 Drawing Sheets

(51) Int. Cl.
*H04B 3/54* (2006.01)
*E21B 17/02* (2006.01)
*E21B 47/12* (2012.01)
*H04B 5/00* (2006.01)
*G01D 5/06* (2006.01)

(52) U.S. Cl.
CPC ......... *H04B 5/0031* (2013.01); *H04B 5/0037* (2013.01); *H04B 5/0093* (2013.01); *G01D 5/06* (2013.01); *H04B 2203/5475* (2013.01)

(58) Field of Classification Search
USPC .......................................................... 307/104
See application file for complete search history.

(56) References Cited

U.S. PATENT DOCUMENTS

| | | | | |
|---|---|---|---|---|
| 4,043,129 A * | 8/1977 | McCabe | | E21B 43/40 166/369 |
| 4,181,014 A * | 1/1980 | Zuvela | | E21B 47/0001 340/853.5 |
| 4,181,468 A * | 1/1980 | Kent | | E21B 17/003 340/854.8 |
| 5,282,508 A * | 2/1994 | Ellingsen | | E21B 17/003 166/249 |
| 5,662,165 A * | 9/1997 | Tubel | | E21B 23/03 166/113 |
| 6,046,685 A * | 4/2000 | Tubel | | E21B 23/03 137/606 |
| 6,369,718 B1 * | 4/2002 | Mathieu | | E21B 47/12 333/100 |
| 8,436,492 B2 * | 5/2013 | Jung | | H02J 7/0027 307/104 |
| 2003/0159823 A1 * | 8/2003 | Pichery | | E21B 17/028 166/250.01 |
| 2004/0112737 A1 * | 6/2004 | Benham | | C23F 13/04 204/196.11 |
| 2007/0085345 A1 * | 4/2007 | Brown | | C23F 13/04 290/44 |
| 2008/0070499 A1 * | 3/2008 | Wilhelm | | H04B 5/00 455/41.1 |
| 2008/0258841 A1 * | 10/2008 | Sherrit | | H01L 41/107 333/187 |
| 2009/0078585 A1 * | 3/2009 | Dwars | | C23F 13/04 205/724 |
| 2010/0025045 A1 | 2/2010 | Lake et al. | | |
| 2010/0270032 A1 * | 10/2010 | Monjure | | E21B 33/03 166/377 |
| 2013/0048269 A1 * | 2/2013 | Tarayre | | E21B 47/122 166/65.1 |
| 2013/0120093 A1 * | 5/2013 | Deville | | E21B 17/028 336/115 |

FOREIGN PATENT DOCUMENTS

| | | |
|---|---|---|
| GB | 2457824 A | 9/2009 |
| JP | 56078240 | 6/1981 |
| WO | 93/26115 A2 | 12/1993 |
| WO | 99/25070 A2 | 5/1999 |
| WO | 99/37044 A1 | 7/1999 |
| WO | 01/04461 A1 | 1/2001 |
| WO | 01/65069 A1 | 9/2001 |

OTHER PUBLICATIONS

UK Search Report for GB Application No. GB1021750.3, dated Apr. 15, 2011.
"New Data Transfer Technology Could Save Millions on Submarine Costs" BAE Systems News Release, Ref. 058/2008, Feb. 19, 2008, available at http://www.baesystems.com/Newsroom/NewReleases/autoGen_10811915746.html.
PCT/ISA/220 Notification of Transmittal of the International Search Report and the Written Opinion of the International Searching Authority, or the Declaration, mailed on Jun. 26, 2013; PCT/ISA/210 International Search Report, completed on Jun. 18, 2013, and mailed on Jun. 26, 2013; and PCT/ISA/237 Written Opinion of the International Searching Authority mailed Jun. 26, 2013 for corresponding PCT International Application No. PCT/GB2011/001713 filed on Dec. 13, 2011.

* cited by examiner

ELECTRICAL POWER AND/OR ELECTRICAL SIGNAL TRANSMISSION

CROSS REFERENCE TO RELATED APPLICATIONS

This application is a 371 National Phase of PCT/GB2011/001713 filed Dec. 13, 2011, and published in English on Jun. 28, 2012 as WO2012/085495, and which claims priority from UK Patent Application No. 1021750.3 filed on Dec. 20, 2010, the entire disclosures of which are incorporated herein by reference.

This invention relates to methods, systems and apparatus for electrical power and/or electrical signal transmission from one side of a metallic wall to another side of the metallic wall.

In a number of situations there is a desire to be able to transmit electrical power and/or electrical signals from one side of a metallic wall to another side of a metallic wall. This can occur, for example, in oil and/or gas installations, for example, oil and/or gas wells, and oil and/or gas pipeline systems, where it is desired to have power within the tubing of the system at one or more locations. It is often difficult or impossible to supply such power or signals via an electrical cable which runs within the tubing due to the risk of damage to the cable and/or potential obstructions which may be caused.

A similar need can arise in other situations where it is desired to transmit electrical power and/or signals through a metallic wall which is designed to prevent the ingress or egress of liquid or gas or to otherwise protect the interior or exterior, or so on. In such situations the metallic wall might be the metallic wall of some kind of processing containment or of a vehicle or a vessel, (e.g. a ship).

In these types of situations, the initial approach for transmitting electrical power and/or signals through the metallic wall will be to provide some type of penetrator through the metallic wall which carries an electrical cable and which is designed so as to not impair the pressure proof nature of the wall. In practical circumstances providing such penetrators with adequate performance is difficult and expensive in many situations, and may to all intents and purposes be impossible.

It is an aim of the present invention to provide a way of transmitting electrical power and/or electrical signals through a metallic wall without using such a penetrator.

According to one aspect of the present invention there is provided an electrical power and/or electrical signal transmission system for transmitting electrical power and/or electrical signals from a location on a first side of a metallic wall to a location on a second side of the metallic wall,
  the system comprising transmitting apparatus comprising an electrical source and a first transformer, the electrical source being electrically connected to a primary winding of the first transformer and first and second ends of a secondary winding of the first transformer being electrically connected to respective spaced locations on the first side of the metallic wall for applying electrical power and/or electrical signals to the metallic wall; and
  the system comprising receiving apparatus comprising a receiving module for receiving electrical power and/or electrical signals and a second transformer, first and second ends of a primary winding of the second transformer being electrically connected to respective spaced locations on the second, opposite, side of the metallic wall for picking up electrical power and/or electrical signals from the metallic wall and the receiving module being electrically connected to a secondary winding of the second transformer to enable electrical power and/or electrical signals to be transmitted from the electrical source to the receiving module.

Typically the primary winding of the first transformer has more turns than the secondary winding of the first transformer and the primary winding of the second transformer has fewer turns than the secondary winding of the second transformer. Thus the applied voltage is stepped down for application to the metallic wall and the picked up voltage is stepped up. Preferably the turns ratio of the transformers are chosen to optimise efficiency of power and/or signal transfer.

The respective spaced locations on the second, opposite, side of the metallic wall may be substantially aligned with the respective spaced locations on the first side of the metallic wall.

The metallic wall may be part of an object having an interior and an exterior and the system may be such that one of the transmitting apparatus and receiving apparatus is located in the interior of the object and the other of the transmitting apparatus and receiving apparatus is located exterior of the object enabling the transmission of electrical power and/or electrical signals between the exterior and the interior of the object.

The object may for example, be a piece of tubing, a container, a vehicle or vessel, or similar. The metallic wall may be a metallic wall in a piece of tubing, a container, a vehicle or vessel, or similar.

In one particular example, the metallic wall may comprise the sidewall of tubing, such as the tubing used in oil and/or gas installations such as pipelines or wells. In such a case, one of the transmitting apparatus and receiving apparatus may be located in the interior of the tubing and the other of the transmitting apparatus and receiving apparatus may be located exterior of the tubing enabling the transmission of electrical power and/or electrical signals between the exterior and the interior of the tubing.

A first end of the primary winding of the first transformer may be electrically connected via a conductor to the electrical source and a second end of the primary winding of the first transformer may be electrically connected or connectable to the metallic wall at a location which is spaced from the spaced locations on the first side of the metallic wall to which the secondary winding is connected.

The electrical source may have a first terminal electrically connected to the primary winding of the first transformer and may have a second terminal electrically connected to the metallic wall at a location which is spaced from the spaced locations on the first side of the metallic wall to which the secondary winding is connected.

The transmitting apparatus may comprise a first plurality of transformers each of the transformers in said first plurality having a primary winding which is electrically connected to the electrical source and each of the transformers in said first plurality having a secondary winding which is electrically connected to the metallic wall with first and second ends of each secondary winding being electrically connected to a respective pair of spaced transmission locations on the first side of the metallic wall for applying electrical power and/or electrical signals to the metallic wall, and with each pair of spaced transmission locations being spaced from each other pair of spaced transmission locations.

This can allow the delivery of power and/or signals to a plurality of different locations on the metallic wall, for pick up from those locations.

A first end of the primary winding of each transformer in the first plurality of transformers may be electrically connected via a conductor to the electrical source and a second end of the primary winding of each transformer in the first plurality of transformers may be electrically connected or connectable to the metallic wall at a location which is spaced from the spaced locations on the first side of the metallic wall to which the secondary windings are connected.

In an alternative there may be a plurality of transmitting apparatus, or at least a portion of the transmitting apparatus may be movable relative to the metallic wall, to allow application of power and/or signals at different selected locations.

There may be a plurality of receiving apparatus, or at least a portion of the receiving apparatus may be movable relative to the metallic wall to allow pick up of power and/or signals at different selected locations.

In an alternative the receiving apparatus may comprise a (second) plurality of transformers each of the transformers in said (second) plurality having a secondary winding which is electrically connected to a receiving module and each of the transformers in said (second) plurality having a primary winding which is electrically connected to the metallic wall with first and second ends of each primary winding being electrically connected to a respective pair of spaced receiving locations on the second side of the metallic wall for picking up electrical power and/or electrical signals from the metallic wall, and with each pair of spaced receiving locations being spaced from each other pair of spaced receiving locations. Note that second is included in brackets above as the above feature may be used in systems with and without a "first plurality of transformers" as defined above.

It will be appreciated that providing apparatus or parts of apparatus in multiple locations and/or providing movable apparatus (or parts thereof) can be used in any convenient combination to allow transmission across the wall selectively at multiple different locations.

The transmitting apparatus may comprise a control system for controlling operation of the first transformer or the first plurality of transformers. The control system may comprise a control unit which activates the first transformer, or a respective one of the first plurality of transformers upon receipt of a control signal. The control system may comprise a central unit for sending said control signal. The control signal may be transmitted to the control unit along a conductor which is also used to connect the electrical source to the respective transformer. The control unit may be connected electrically between the conductor and the metallic wall. The control system may comprise a switch which is controlled by the control unit and which is arranged to make and break an electrical connection between the primary of the respective transformer and the metallic wall.

Whilst the above has been written in the terms of one way transmission, especially in the case of signals, there may be two way transmission. Thus the transmitting apparatus may be first transceiving apparatus and the receiving apparatus may be second transceiving apparatus. In such a case the respective transformers can each function irrespective of the direction of transmission and their structure remain unchanged, although of course what was labelled as a primary for transmission in one direction will act as a secondary for transmission on the other direction and vice versa. The first and second transceiving apparatus can both comprise at least one respective electrical source and at least one respective receiving module.

In one embodiment there is provided transmission apparatus in which:

the electrical source is provided at a first location and is electrically connected to a first plurality of transformers, each of the transformers in said first plurality has a primary winding which is electrically connected to the electrical source and each of the transformers in said first plurality has a secondary winding which is electrically connected to the metallic wall with first and second ends of each secondary winding being electrically connected to a respective pair of spaced transmission locations on the first side of the metallic wall for applying electrical power and/or electrical signals to the metallic wall, and with each pair of, spaced transmission locations being spaced from each other pair of spaced transmission locations and spaced from the first location, and the transmitting apparatus comprises a control system for controlling operation of the first plurality of transformers, the control system comprising a central unit and a plurality of control units each of which control units is arranged to activate a respective one of the first plurality of transformers upon receipt of a control signal from the central unit.

According to another aspect of the present invention there is provided an oil and/or gas installation comprising an electrical power and/or electrical signal transmission system as defined above and metallic tubing, a sidewall of which comprises said metallic wall.

The installation might be a well installation and/or a pipeline installation.

Where the installation comprises a well installation, the transmission system may be arranged for transmitting electrical power and the electrical source of the transmitting apparatus may be located at the surface and the or each transformer of the transmitting apparatus may be located at a selected location downhole. In such an instance the receiving apparatus may be provided in a tool located within the tubing of the well. The tool may be movable relative to the tubing.

This can provide a convenient means for transmitting power to a plurality of locations downhole and within the tubing.

The receiving module can take many forms, for example the receiving module may comprise a charge storage device such as a cell, battery or (large value) capacitor, the receiving module may comprise an electronics module for receiving and decoding signals and so on.

According to another aspect of the present invention there is provided transmitting apparatus for use in an electrical power and/or electrical signal transmission system for transmitting electrical power and/or electrical signals from a location on a first side of a metallic wall to a location on a second side of the metallic wall, the transmitting apparatus comprising an electrical source and a first transformer, the electrical source being electrically connected to a primary winding of the first transformer and first and second ends of a secondary winding of the first transformer being arranged for electrical connection to respective spaced locations on the first side of the metallic wall for applying electrical power and/or electrical signals to the metallic wall.

According to another aspect of the present invention there is provided receiving apparatus for use in an electrical power and/or electrical signal transmission system for transmitting electrical power and/or electrical signals from a location on a first side of a metallic wall to a location on a second side of the metallic wall, the receiving apparatus comprising a receiving module for receiving electrical power and/or electrical signals and a transformer, first and second ends of a primary winding of the transformer being arranged for electrical connection to respective spaced locations on the second side of the metallic wall for picking up electrical power and/or electrical signals from the metallic wall and the receiving module being electrically connected to a secondary winding of the transformer.

According to a further aspect of the present invention there is provided a method of transmitting electrical power and/or electrical signals from a location on a first side of a metallic wall to a location on a second side of the metallic wall, the method comprising the steps of:

providing transmitting apparatus comprising an electrical source and a first transformer, electrically connecting the electrical source to a primary winding of the first transformer and electrically connecting first and second ends of a secondary winding of the first transformer to respective spaced locations on the first side of the metallic wall, applying electrical power and/or electrical signals to the metallic wall via the first transformer; and providing receiving apparatus comprising a receiving module for receiving electrical power and/or electrical signals and a second transformer, electrically connecting first and second ends of a primary winding of the second transformer to respective spaced locations on the second, opposite, side of the metallic wall and electrically connecting the receiving module to a secondary winding of the second transformer, and picking up electrical power and/or electrical signals from the metallic wall to enable electrical power and/or electrical signals to be transmitted from the electrical source to the receiving module via the first and second transformers.

According to another aspect of the present invention there is provided an electrical power and/or electrical signal transmission system for transmitting electrical power and/or electrical signals between the exterior and the interior of an object having a metallic wall, the system comprising transmitting apparatus comprising an electrical source and a first transformer, the electrical source being electrically connected to a primary winding of the first transformer and first and second ends of a secondary winding of the first transformer being electrically connected to respective spaced locations on a first side of the metallic wall for applying electrical power and/or electrical signals to the metallic wall;

the system comprising receiving apparatus comprising a receiving module for receiving electrical power and/or electrical signals and a second transformer, first and second ends of a primary winding of the second transformer being electrically connected to respective spaced locations on a second, opposite, side of the metallic wall for picking up electrical power and/or electrical signals from the metallic wall and the receiving module being electrically connected to a secondary winding of the first transformer;

one of the transmitting apparatus and receiving apparatus being located in the interior of the object and the other of the transmitting apparatus and receiving apparatus being located exterior of the object such that in use of the system electrical power and/or electrical signals are transmitted between the exterior and the interior of the object.

The receiving module may comprise a cathodic protection unit which is connected to at least one cathodic protection anode.

According to another aspect of the present invention there is provided an impressed current cathodic protection system for protecting a metallic structure having a metallic wall, the system comprising an electrical power source provided one side of the metallic wall, and a cathodic protection unit and at least one cathodic protection anode provided on another side of the metallic wall, and further comprising an electrical power transmission system as defined above for transmitting power from the electrical power source to the cathodic protection unit.

According to a further aspect of the present invention there is provided an impressed current cathodic protection system for protecting a metallic structure having a metallic wall, the system comprising an electrical power source provided one side of the metallic wall, and a cathodic protection unit and at least one cathodic protection anode provided on another side of the metallic wall, the system further comprising transmission means for transmitting power from the electrical power source to the cathodic protection unit, the transmission means comprising a first transformer and a second transformer, the electrical power source being electrically connected to a primary winding of the first transformer and first and second ends of a secondary winding of the first transformer being electrically connected to respective spaced locations on the first side of the metallic wall for applying electrical power to the metallic wall;

first and second ends of a primary winding of the second transformer being electrically connected to respective spaced locations on the second, opposite, side of the metallic wall for picking up electrical power from the metallic wall and the cathodic protection unit being electrically connected to a secondary winding of the second transformer to enable electrical power to be transmitted from the electrical source to the cathodic protection unit; and the cathodic protection unit being arranged for using the received power and cathodic protection anode to apply cathodic protection currents to the metallic structure.

The optional features defined above in respect of the earlier aspects of the invention are equally applicable to said further aspect defined immediately above. Similarly the optional features defined below are applicable to all aspects above where context allows.

The cathodic protection unit may comprise a rectifier converting the ac signals received from the secondary winding of the second transformer to dc signals for use in cathodic protection. The rectifier may have inputs connected to the the secondary winding of the second transformer and one output connected to the cathodic protection anode and another output connected to metallic structure to be protected.

The rectifier may be an active bridge (synchronous rectifier).

The cathodic protection system may comprise a plurality of cathodic protection anodes. Each cathodic protection anode may be provided with a respective cathodic protection unit and/or powered via respective transmission means. Alternatively multiple anodes may be driven by one cathodic protection unit and/or multiple sub cathodic protection units may use power collected at one main cathodic protection unit.

The or each anode may be of Platinised Titanium.

The metallic wall may be part of the hull of a vessel. Further where there is a metallic structure this may comprise the hull of a vessel. This is likely to have most utility where the present invention is used to provide cathodic protection.

Embodiments of the present invention will now be described, by way of example only, with reference to the accompanying drawings in which.

Figure 1:
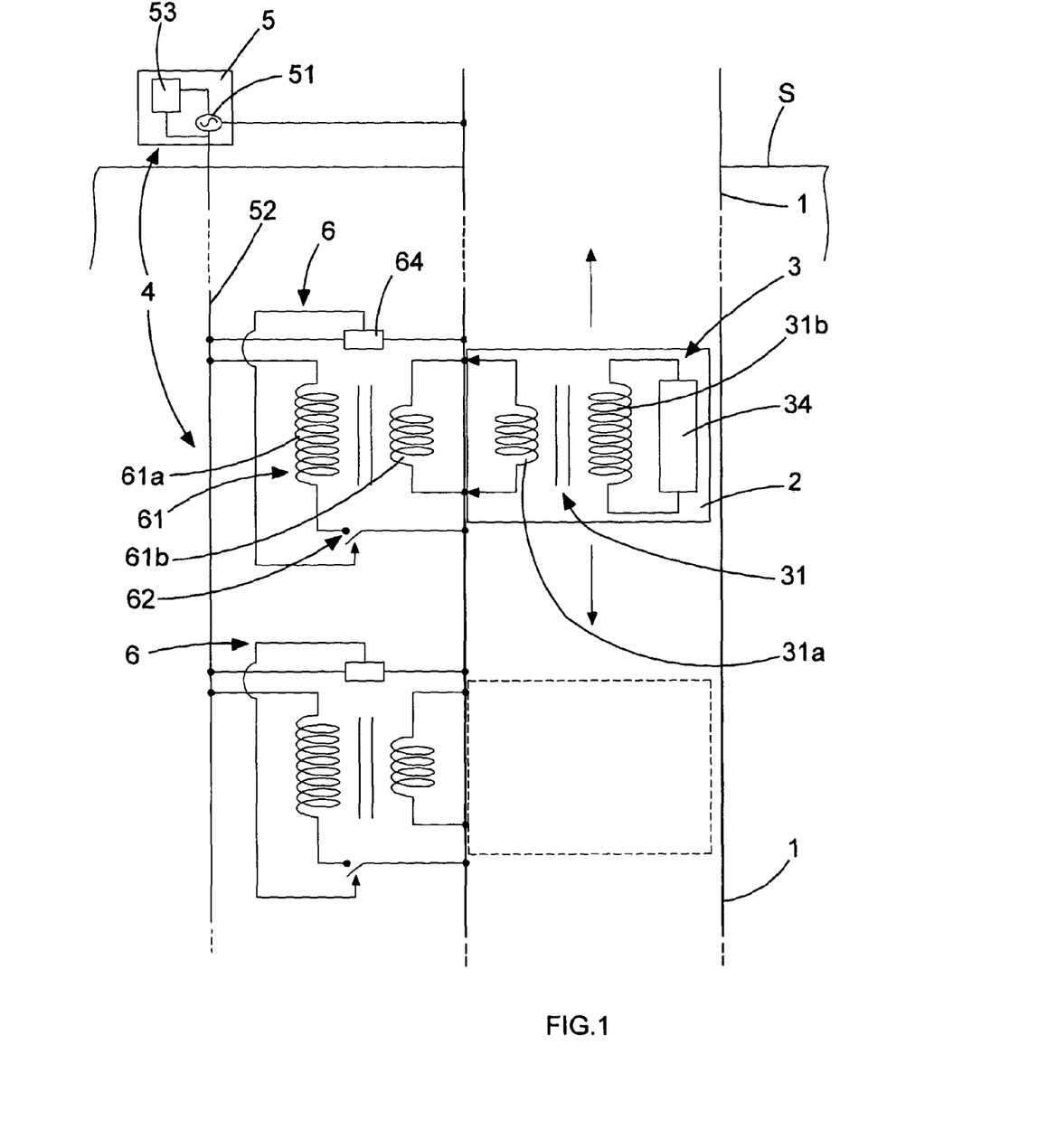
FIG. 1 schematically shows an oil and/or gas well installation incorporating an electrical power and electrical signal transmission system.

FIG. 1 schematically shows part of an oil and/or gas well installation which comprises an electrical power and electrical signal transmission system. The well installation comprises metallic structure including metallic tubing 1 running from the surface S downhole into the well. It will be appreciated that only part of the metallic structure of the well installation is shown in FIG. 1 and that this is shown in highly schematic form. Within the tubing 1 there is provided a tool 2 which is moveable within the tubing 1. Housed within the tool 2 there is provided receiving apparatus 3 which in fact in this embodiment is transceiving apparatus. The well installation also comprises transmitting apparatus 4 which again, in this embodiment, actually is transceiving apparatus. Together the receiving apparatus 3, transmitting apparatus 4, and a portion of the tubing 1, make up an electrical power and electrical signal transmission system.

Note that whilst the tool 2 is moveable in this embodiment, in alternatives a static tool or internal device may be provided in the tubing. This may be set in position using one or more appropriate setting device.

The transmitting apparatus 4 comprises a surface unit 5 and a plurality of downhole units 6 (only two of which are shown in FIG. 1). The downhole units 6 are provided at spaced locations along the length of the tubing 1 as it progresses down into the well. The surface unit 5 includes an electrical power source 51 which has one terminal connected to the metallic structure of the well at or near the surface and another terminal connected by one or more appropriate conductors 52 to each of the downhole units 6.

It will be appreciated that in implementations where a system such as this is not used in a well then a similar arrangement could be provided. In such a circumstance it would of course be inappropriate to describe the surface unit 5 as a surface unit, and the downhole units 6 as downhole units, and in such a case these might be termed a main unit and auxiliary units.

The surface unit 5 also comprises a central control unit 53 which is used to control operation of the electrical power source 51 as well as the general operation of the transmission apparatus 4 as a whole.

Each downhole unit 6 comprises a respective transformer 61, which has a primary winding 61a which has a first terminal connected to the electrical power source 51 via the conductor 52 and a second terminal connected to the tubing 1 via a switch 62. The transformer 61 of each downhole unit 6 has a secondary winding 61b which has a first terminal connected at one location to the tubing 1, and a second terminal connected to the tubing 1 at another, spaced, location.

Each downhole unit 6 also comprises a control unit 64 which controls whether the switch 62 is open or closed. The control unit 64 of each downhole unit 6 is connected between the metallic tubing 1 and the conductor 52.

Together the central control unit 53, and the control unit 64 and switch 62 of each of the downhole units 6 form a control system for controlling operation of each of the respective transformers 61 of the downhole units 6.

The receiving apparatus 3 in the tool 2 comprises a transformer 31 having a primary winding 31a. A first end of the primary winding 31a is electrically connected to the tubing 1 via a contact which does not inhibit the ability of the tool 2 to move within the tubing 1 and the second end of the primary winding 31a is electrically connected to the tubing 1 via a similar contact. The spacing between the contacts in the tool 2 at the ends of the primary winding 31a is chosen to be the same, or substantially the same, as the spacing between the connection points of the secondary winding 61b of the downhole units 6 to the tubing 1. This means that when the tool 2 is correctly positioned, these contact points on either side of the tubing wall 1 align with one another.

The transformer 31 of the tool 2 has a secondary winding 31b and connected between the terminals of this winding 31b is a receiving module 34.

Note of course that components within each downhole unit 6, for example the control unit 64 can draw power from that supplied along the conductor 52 leading to the downhole unit 6.

Note that whilst in the above embodiment, the second terminal of the primary winding 61a of each downhole unit transformer 61 is connected to the tubing via a switch in an alternative the second terminal may be connected to another conductor via a switch to act as a return path. As an example this second conductor might run along with the main conductor 52, for example a dual conductor cable could be used.

The arrangement described above with reference to FIG. 1 can be used for the transmission of electrical power and/or signals between the surface unit 5 and the tool 2 in both directions (in this embodiment) as will be described in more detail below.

In this embodiment, when it is desired to transmit power and/or signals, the tool 2 is first of all located in the correct location relative to one of the downhole units 6 such that the contacts of the primary winding 31a of the tool align with the contact locations of the secondary winding 61b of the downhole unit 6. Then the central control unit 53 transmits a signal along the conductor 52 to the control unit 64 of the appropriate downhole unit 6 and as a result of this control signal, the switch 62 of that downhole unit 6 is closed whilst the switches 62 of the other downhole units are left open. It will be appreciated that this can be achieved by each of the downhole units having an address or being arranged to react to a signal with a different characteristic such as a different frequency or so on.

Now that the system is ready to transmit, electrical power and/or electrical signals can be applied to the downhole unit 6 from the surface unit 5. Whether these are electrical signals or electrical power, the resulting current will run through the primary winding 61a of the downhole unit which in turn will induce current in the secondary winding 61b in the conventional way. This will cause a varying voltage to be applied to the tubing 1 in the region of the contacts of the downhole unit 6 which may be picked up by the contacts of the tool 2 to induce a resulting current in the primary winding 31a of the transformer 31 of the tool, inducing resulting currents in the secondary winding 31b which in turn can be detected or harvested by the receiving module 34.

The relative number of turns on the primary and secondary windings of the downhole unit 6 and tool 2 can be chosen dependent on individual circumstances. The aim is to ensure that the electrical signals/power have the maximum chance of progressing through the metallic wall (of the tubing in this case) so as to be detectable/harvestable on the other side. Generally very high current is preferable for this since the tubing has very low impedance. For situations as in the present embodiment, where it is desired to transmit power and/or signals across tubing of the type used in oil and/or gas installations, the primary winding 61*a* of the downhole unit 6 should include perhaps 1000 turns, whereas the secondary winding 61*b* of the downhole unit should include perhaps 2 turns. Similarly, the primary winding 31*a* in the tool 2 should include perhaps two turns and the secondary winding 31*b* in the tool 2 should include perhaps 1000 turns.

Furthermore, if it is desired to transmit power in an embodiment of the present kind then the electrical power source 51 may be arranged to apply a current of the order of 2 Amps at 100 Volts to the conductor 52 and the frequency of the applied signals may be in the order of say 200 Hz to 400 Hz. Of course all of these values could be varied for other embodiments/situations.

In general there will be an optimum frequency to use depending on the circumstances. Due to the skin effect increasing frequency will tend to improve performance—there is a higher resistance path through a skin of the tubing across which potential difference can be developed. But this will be countered by increasing losses in transmission through the wall.

As might be expected due to losses in the wall the efficiency of energy transfer in a system such as this is likely to be relatively low. Thus, if 10 watts of power are put into the primary winding 61*a* of a downhole unit it might be expected that 50 miliwatts of power can be harvested by the receiving module 34.

Of course it will be appreciated that if it is desired to transmit signals from the surface unit 5 to the tool 2 so that data can be communicated from the surface unit 5 to the tool 2, then basically the same technique is used but the signals applied to the conductor and hence the downhole unit 6 are first encoded with data which can be received and decoded by the receiving module 34.

As mentioned above, in this embodiment both the receiving apparatus 3 and transmitting apparatus 4 are in fact transceiving apparatus. Thus the receiving apparatus may be used to send signals to the surface unit 5. In this case the same principles apply and provided that sufficient power is available, the receiving module 34 may apply signals to the tubing 1 which can be picked up by the downhole unit 6 and detected at the surface unit 5. Thus in a particular implementation, the tool may be moved to a desired location for taking, for example, pressure and temperature readings and may be powered up by power delivered from the surface using the mechanism described above and then transmit its results back to the surface using the reverse mechanism.

In FIG. 1 the tool 2 is shown in the position for communicating via a first of the downhole units 6 and it will be appreciated that it could similarly be positioned as shown in dotted lines relative to the second of the downhole units 6 and carry out the same processes in that location. Thus, again for example, in this other location the tool 2 could be used to take pressure and temperature readings and transmit these back to the surface.

In other circumstances, similar principles apply. Thus, if this system is to be used on a vehicle or vessel with metallic walls or some containment with metallic walls, similarly a plurality of auxiliary units may be provided on one side of the metallic wall to provide data and/or power transmitting and receiving locations, and similarly, a moveable unit might be provided on the other side of the metallic wall which can be moved between these various transmitting and receiving locations for transmission and receiving. Alternatively of course, there may be moveable units on both sides of the metallic wall or a plurality of stationary units on both sides of the metallic wall.

It will of course be appreciated that the electrical contacts with the wall of the tubing discussed above are on opposite sides of the tubing wall with no penetration through the wall. Thus the material of the wall is still present to act as a pressure and fluid barrier and so on and the electrical signals/power need to pass through the material of the wall. In some instances the contacts may be permanent with perhaps mechanical connection between terminals/conductors and the wall but in other instances there may be a simple surface to surface electrical contact or contacts that can bite into the wall for use in transmission/reception and later be removed or extracted. In the oil and gas sphere these types of contacts may be in the form of setting devices used to (releasably) set tools within tubing. Of course any contact with the wall may be on a projection of the wall or in a recess of the wall if this is appropriate.

Note that whilst the present techniques cannot, in general, offer a very high efficiency of electrical power transfer relatively high bandwidth may be provided for transmitting signals across a metallic wall. Thus in one particular implementation video signal could be transmitted through a metallic wall using the current techniques. Such signals might offer only a relatively low resolution and/or refresh rate but could be useful to provide monitoring images through a metallic wall.

Figure 2:
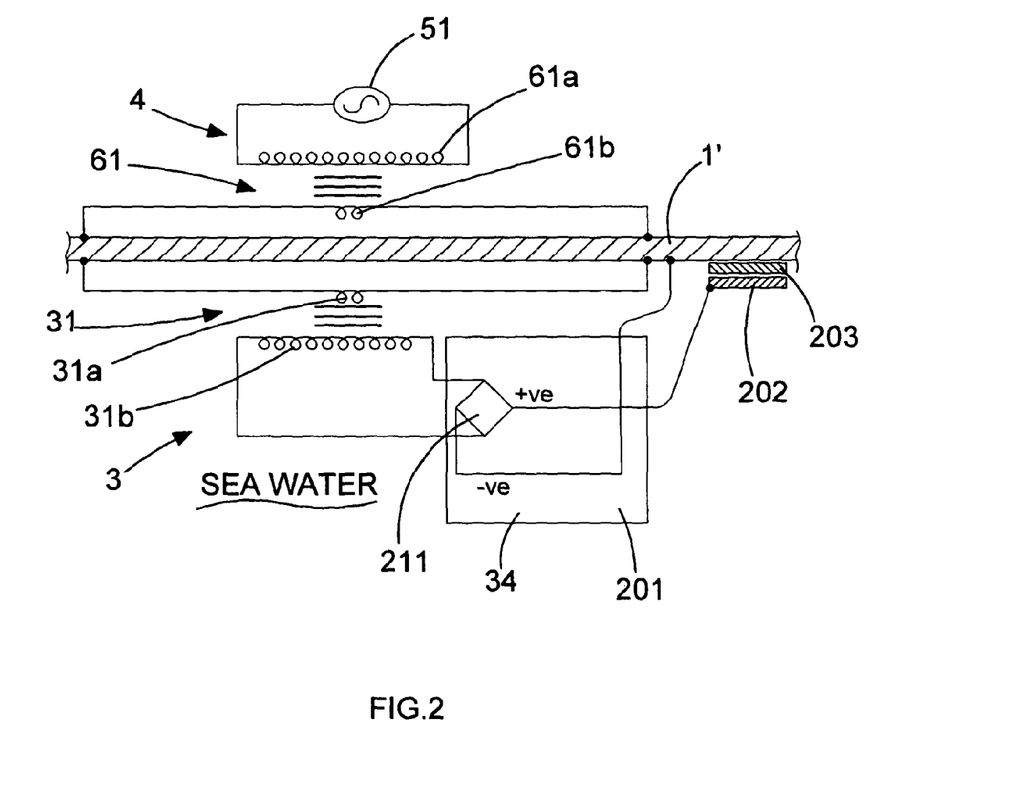
FIG. 2 schematically shows a structure which incorporates a cathodic protection system using an electrical power transmission system of a similar kind to that as shown in FIG. 1.

FIG. 2 schematically shows part of a structure which incorporates an impressed current cathodic protection system using an electrical power transmission system of a similar kind to that as shown as part of FIG. 1. The structure incorporating the cathodic protection system might for example be a vessel, e.g. a ship. Here there is a metallic wall 1' which might be the hull of a ship. The cathodic protection system is provided to protect the structure and in particular the wall 1' from corrosion.

Generally speaking the cathodic protection system is provided on the outside of the wall 1', i.e. a surface which would be in contact with sea water in the case of a vessel, whilst the power supply for powering the cathodic protection system is provided on the inside of the wall 1'.

The power transmission techniques described above are used to transmit power from the inside of the wall 1' to the outside of the wall 1' to power the cathodic protection system.

Thus in the present system there is again transmission apparatus 4 comprising an electrical power source 51 and a first transformer 61 on one side of the wall 1' and receiving apparatus 3 provided on the other side of the wall 1'. In this embodiment the receiving apparatus 3 comprises a second transformer 31, as in the embodiment shown in FIG. 1, but the receiving module 34 takes the form of a cathodic protection unit 201.

As in the system described above with reference to FIG. 1, the first transformer 61, which is part of the transmission apparatus 4, has a primary winding 61*a* connected to the electrical power source 51 and a secondary winding 61*b* connected at spaced locations to the metallic wall 1'.

Similarly the second transformer 31, i.e. that in the receiving apparatus 3, comprises a primary winding 31*a* connected between spaced points on the metallic wall 1'. These points are aligned with the connection points of the secondary winding 61*b* of the first transformer but on the opposite side of the wall 1'. From a practical point of view the alignment does not have to be perfect but functioning of the system decreases as alignment gets worse. Thus alignment or substantial alignment is best, but a misalignment of up to 10% of the total connection point spacing should still yield good useful results. This alignment consideration applies similarly to the more general use of the present techniques described further above. The second transformer 31 comprises a secondary winding 31b which is connected to the cathodic protection unit 201.

The cathodic protection unit 201 comprises a bridge rectifier 211 for converting AC signals into DC signals. In practical terms this will be an active bridge (synchronous rectifier). The inputs of the bridge rectifier 211 are connected to the secondary winding 31b of the second transformer 31. On the other hand, the negative output of the bridge rectifier 21 is connected to the metallic wall 1' whilst the positive output is connected to an electrode 202 provided on the external side of the wall 1' which can act as a (non-sacrificial) cathodic protection anode. The electrode 202 is insulated from direct contact with the metallic wall 1' by insulating material 203 and provides electrical connection to earth via the surrounding water.

In this way, impressed current cathodic protection may be applied to the metallic wall 1' by virtue of electrical power from the electrical power source 51 being transmitted through the wall using the first 61 and second 31 transformers, and this AC current being rectified in the cathodic protection unit 201 for application to the metallic wall 1' and electrode 202.

In an example where the metallic wall is a hull of a ship, the primary winding 61a of the first transformer 61 may have a thousand turns and the secondary winding 61b may have two turns. Then in the second transformer 31, the primary winding may have two turns and the secondary winding 31b two hundred turns. Thus, in this example, in the first transformer the turns ratio may be 500:1 and the second transformer the turns ratio may be 1:100. The electrical power source 51 may be arranged to apply tens of volts to the primary winding 61a such that perhaps 10 mV are applied to the wall 1' by the secondary winding 61b. The spacing between the contacts to the metallic wall 1' may be in the range of 5 m for this type of example.

It is preferred to use an active bridge as the rectifier since a diode based bridge will suffer from a voltage drop across the diodes which will reduce practicality/efficiency.

The electrode 202 will typically be of platinised titanium and may have an area of 1 m$^2$ or larger.

In the system shown in FIG. 1 there is a single electrode 202. Of course in a practical system there are likely to be more electrodes 202. A series of electrodes 202 might be fed from one cathodic protection unit 201 being fed from one power source 51.

However in at least some implementations there may be more than one transmission apparatus transformer 61 (with individual power sources or a shared power source) and correspondingly more than one receiving apparatus 3 for receiving power at a multiple number of locations over the surface of the wall 1' to be protected. In such a case there may be one or more electrode 202 associated with each receiving apparatus.

Note that in this specification the expression cathodic protection anode is used to refer to an electrode used as an anode in an impressed current cathodic protection system. Thus typically the anode will be of a non-active material and not arranged as a passive sacrifical anode.

The invention claimed is:

1. An electrical transmission system for transmitting at least one of electrical power and electrical signals from a location on a first side of a metallic wall to a location on a second side of the metallic wall, the system comprising:
   a transmitting apparatus comprising an electrical source and a first transformer, the electrical source being electrically connected to a primary winding of the first transformer and first and second ends of a secondary winding of the first transformer being electrically connected to respective spaced locations on the first side of the metallic wall for applying at least one of electrical power and electrical signals to the metallic wall to pass the at least one of electrical power and electrical signals through the material of the metallic wall; and
   a receiving apparatus comprising a receiving module for receiving at least one of electrical power and electrical signals and a second transformer, first and second ends of a primary winding of the second transformer being electrically connected to respective spaced locations on the second, opposite, side of the metallic wall for picking up at least one of electrical power and electrical signals from the metallic wall after the at least one of electrical power and electrical signals have been passed through the material of the metallic wall and the receiving module being electrically connected to a secondary winding of the second transfoillter to enable at least one of electrical power and electrical signals to be transmitted from the electrical source to the receiving module.

2. A transmission system as claimed in claim 1 in which the respective spaced locations on the second, opposite, side of the metallic wall are substantially aligned with the respective spaced locations on the first side of the metallic wall.

3. A transmission system as claimed in claim 1, in which the metallic wall is part of an object having an interior and an exterior and the system is such that one of the transmitting apparatus and receiving apparatus is located in the interior of the object and the other of the transmitting apparatus and receiving apparatus is located exterior of the object enabling the transmission of at least one of electrical power and electrical signals between the exterior and the interior of the object.

4. A transmission system according to claim 1 in which a first end of the primary winding of the first transformer is electrically connected via a conductor to the electrical source and a second end of the primary winding of the first transformer is one of electrically connected to and electrically connectable to the metallic wall at a location which is spaced from the spaced locations on the first side of the metallic wall to which the secondary winding is connected.

5. A transmission system according to claim 1 in which the electrical source has a first terminal electrically connected to the primary winding of the first transformer and a second terminal electrically connected to the metallic wall at a location which is spaced from the spaced locations on the first side of the metallic wall to which the secondary winding is connected.

6. A transmission system according to claim 1 in which the transmitting apparatus comprises a first plurality of transformers each of the transformers in said first plurality having a primary winding which is electrically connected to the electrical source and each of the transformers in said first plurality having a secondary winding which is electrically connected to the metallic wall with first and second ends of each secondary winding being electrically connected to a respective pair of spaced transmission locations on the first side of the metallic wall for applying at least one of electrical power and electrical signals to the metallic wall, and with each pair of spaced transmission locations being spaced from each other pair of spaced transmission locations.

7. A transmission system according to claim 6 in which a first end of the primary winding of each transformer in the first plurality of transformers is electrically connected via a conductor to the electrical source and a second end of the primary winding of each transformer in the first plurality of transformers is one of electrically connected to and electrically connectable to the metallic wall at a location which is spaced from the spaced locations on the first side of the metallic wall to which the secondary windings are connected.

8. A transmission system according to claim 1 in which there is a plurality of receiving apparatus, or at least a portion of the receiving apparatus is movable relative to the metallic wall to allow pick up of at least one of power and/or signals at different selected locations.

9. A transmission system according to claim 1 in which the transmitting apparatus comprises a control system for controlling operation of one of the first transformer and a first plurality of transformers.

10. A transmission system according to claim 9 in which the control system comprises a control unit which activates one of the first transformer, and a respective one of the first plurality of transformers, upon receipt of a control signal, the control system comprising a central unit for sending said control signal, the system being arranged so that the control signal is transmitted to the control unit along a conductor which is also used to connect the electrical source to the respective transformer.

11. A transmission system according to claim 9 in which the control system comprises a switch, which is arranged to make and break an electrical connection between the primary of the respective transformer and the metallic wall.

12. A transmission system according to claim 1 in which the receiving module comprises a cathodic protection unit which is connected to at least one cathodic protection anode.

13. A transmission system according to claim 1, wherein the transmission apparatus is one in which:
the electrical source is provided at a first location and is electrically connected to a first plurality of transformers,
each of the transformers in said first plurality has a primary winding which is electrically connected to the electrical source and each of the transformers in said first plurality has a secondary winding which is electrically connected to the metallic wall with first and second ends of each secondary winding being electrically connected to a respective pair of spaced transmission locations on the first side of the metallic wall for applying at least one of electrical power and electrical signals to the metallic wall, and with each pair of spaced transmission locations being spaced from each other pair of spaced transmission locations and spaced from the first location, and
the transmitting apparatus comprises a control system for controlling operation of the first plurality of transformers, the control system comprising a central unit and a plurality of control units each of which control units is arranged to activate a respective one of the first plurality of transformers upon receipt of a control signal from the central unit.

14. An at least one of an oil and gas installation comprising an at least one of electrical power and electrical signal transmission system according to claim 1 and metallic tubing, a sidewall of which comprises said metallic wall.

15. An installation as claimed in claim 14 which is a well installation, with the transmission system arranged for transmitting electrical power and the electrical source of the transmitting apparatus being located at the surface and the or each transformer of the transmitting apparatus being located at a selected location downhole.

16. A transmitting apparatus for use in an at least one of electrical power and electrical signal transmission system for transmitting at least one of electrical power and electrical signals from a location on a first side of a metallic wall to a location on a second side of the metallic wall;
the transmitting apparatus comprising an electrical source and a first transformer, the electrical source being electrically connected to a primary winding of the first transformer and first and second ends of a secondary winding of the first transformer being arranged for electrical connection to respective spaced locations on the first side of the metallic wall for applying electrical power and/or electrical signals to the metallic wall to pass the at least one of electrical power and electrical signals through the material of the metallic wall.

17. A receiving apparatus for use in an at least one of electrical power and electrical signal transmission system for transmitting at least one of electrical power and electrical signals from a location on a first side of a metallic wall to a location on a second side of the metallic wall,
the receiving apparatus comprising a receiving module for receiving at least one of electrical power and electrical signals and a transformer, first and second ends of a primary winding of the transformer being arranged for electrical connection to respective spaced locations on the second side of the metallic wall for picking up at least one of electrical power and electrical signals from the metallic wall after the at least one of electrical power and electrical signals have been passed through the material of the metallic wall and the receiving module being electrically connected to a secondary winding of the transformer.

18. A method of transmitting at least one of electrical power and electrical signals from a location on a first side of a metallic wall to a location on a second side of the metallic wall, the method comprising the steps of:
providing a transmitting apparatus comprising an electrical source and a first transformer,
electrically connecting the electrical source to a primary winding of the first transformer and electrically connecting first and second ends of a secondary winding of the first transformer to respective spaced locations on the first side of the metallic wall,
applying at least one of electrical power and electrical signals to the metallic wall via the first transformer, passing the at least one of electrical power and electrical signals through the material of the metallic wall; and
providing a receiving apparatus comprising a receiving module for receiving at least one of electrical power and electrical signals and a second transformer,
electrically connecting first and second ends of a primary winding of the second transformer to respective spaced locations on the second, opposite, side of the metallic wall and electrically connecting the receiving module to a secondary winding of the second transformer, and
picking up at least one of electrical power and electrical signals from the metallic wall after the at least one of electrical power and electrical signals have been passed through the material of the metallic wall to enable at least one of electrical power and electrical signals to be transmitted from the electrical source to the receiving module via the first and second transformers.

19. An impressed current cathodic protection system for protecting a metallic structure having a metallic wall, the system comprising an electrical power source provided one side of the metallic wall, and a cathodic protection unit and at least one cathodic protection anode provided on another side of the metallic wall, the system further comprising transmission means for transmitting power from the electrical power source to the cathodic protection unit the transmission means comprising a first transformer and a second transformer, the electrical power source being electrically connected to a primary winding of the first transformer and first and second ends of a secondary winding of the first transformer being electrically connected to respective spaced locations on the first side of the metallic wall for applying electrical power to the metallic wall to pass the electrical power through the material of the metallic wall;

the first and second ends of a primary winding of the second transformer being electrically connected to respective spaced locations on the second, opposite, side of the metallic wall for picking up electrical power from the metallic wall and the cathodic protection unit being electrically connected to a secondary winding of the second transformer to enable electrical power to be transmitted from the electrical source to the cathodic protection unit; and the cathodic protection unit being arranged for using the received power and cathodic protection anode to apply cathodic protection currents to the metallic structure.

\* \* \* \* \*